United States Patent [19]
Barone

[11] Patent Number: 5,786,538
[45] Date of Patent: *Jul. 28, 1998

[54] MARINE IMPELLER TESTER

[76] Inventor: Larry A. Barone, 7342 N. 43rd La., Glendale, Ariz. 85301

[*] Notice: The term of this patent shall not extend beyond the expiration date of Pat. Nos. 5,668,321, 5,503,022 and 5,445,012.

[21] Appl. No.: 823,409

[22] Filed: Mar. 25, 1997

Related U.S. Application Data

[60] Continuation of Ser. No. 616,180, Mar. 15, 1996, Pat. No. 5,668,321, which is a division of Ser. No. 341,675, Nov. 17, 1994, Pat. No. 5,503,022, which is a continuation-in-part of Ser. No. 253,972, Jun. 3, 1994, Pat. No. 5,445,012, which is a continuation of Ser. No. 8,474, Jan. 25, 1993, abandoned.

[51] Int. Cl.$^6$ ............................................. G01L 7/00
[52] U.S. Cl. ............................................. 73/714
[58] Field of Search .......................... 73/1.57–1.64, 73/1.66–1.72, 115, 116, 117.1, 714, 740, 732, 737–739, 741–743; 116/26, 264–266, 271, 291, 300; 440/2

[56] References Cited

U.S. PATENT DOCUMENTS

| | | |
|---|---|---|
| 2,100,754 | 11/1937 | Seegers . |
| 2,227,514 | 10/1941 | Seegers . |
| 2,247,102 | 6/1941 | Sugden et al. . |
| 3,969,931 | 7/1976 | Lanning . |
| 5,445,012 | 8/1995 | Barone . |
| 5,503,022 | 4/1996 | Barone . |
| 5,668,321 | 9/1997 | Barone . |

FOREIGN PATENT DOCUMENTS

| | | |
|---|---|---|
| 277473 | 9/1930 | Italy . |
| 546083 | 7/1956 | Italy . |

*Primary Examiner*—Robert Raevis
*Attorney, Agent, or Firm*—H. Gordon Shields

[57] ABSTRACT

A marine engine is provided with an drive unit which incorporates a water impeller to supply water to the marine engine in order to maintain proper engine cooling. An impeller tester of the present invention is connected to the drive unit to measure the pressure of the input and output of the impeller. This allows an operator to determine if the impeller will produce sufficient pressure for cooling the engine.

11 Claims, 2 Drawing Sheets

5,786,538

MARINE IMPELLER TESTER

CROSS REFERENCE TO RELATED APPLICATION

This application is a Continuation application of Ser. No. 08/616,180, now U.S. Pat. No. 5,668,321, filed Mar. 15, 1996, which was a Divisional application of Ser. No. 08/341, 675, now U.S. Pat. No. 5,503,022, filed Nov. 17, 1994, which was a Continuation In Part application of Ser. No. 08/253,972, now U.S. Pat. No. 5,445,012, filed Jun. 3, 1994, which is a Continuation application of Ser. No. 08/008,474, now abandoned, filed Jan. 25, 1993.

BACKGROUND OF THE INVENTION

1. Field of the Invention

The field of the invention relates to engines for boats, and more particularly, to a new and improved method of determining if the water impeller, which is located in the drive unit, of a marine engine, and which pumps coolant water to the engine from the body of water on which the boat is disposed, is functioning correctly.

The impeller tester provides for the measurement of the inlet and outlet water pressures. These pressures are measured to indicate to the operator if the water impeller has adequate water supply and if the water impeller is functioning properly.

2. Description of the Prior Art

While various devices and components have been utilized in the prior art in allowing the marine engine to be started and run out of water, they have not communicated if the water impeller in the drive unit is functioning properly.

Prior state of the art devices are only designed to supply water to the marine engines drive unit. These devices allow for a method to attach a standard garden hose from a faucet to the drive unit. The amount of water supplied from the faucet is not monitored by these devices and only allows that water be supplied to the marine engine by the water pressure which is available within the municipal water system. A fault of these water supply systems is that they do not indicate if sufficient water pressure is being supplied to safely run the engine, without damaging the water impeller, nor can they determine if the water impeller which is located in the drive unit is functioning and capable of pumping non-pressurized water to the marine engine. These devices thereby will allow the engine to function correctly and not over heat when tested out of the water even though the water impeller in the drive unit has failed and is no longer capable of pumping ambient water (unpressurized) to the marine engine when the watercraft is put in actual service.

As such, it may be appreciated that there continues to be a need for a new and improved method to monitor water pressures both while supplying water to a marine engine when being tested out of water and while the craft is in actual service.

The testing of the watercraft's marine engine is done out of water in order to determine if the marine engine is operating properly prior to taking it to an area intended for watercraft use.

Prior state of the art devices allow water to be supplied to the marine engine but do not communicate if the drive components are functioning properly. This is due to the water being supplied under pressure. Wherein, water under pressure will supply the engine with sufficient coolant so that it appears to be functioning properly even though the water impeller has failed and will not supply water to the marine engine when the watercraft is put in actual use.

U.S. Pat. No. 2,100,754 (Seegers) discloses a pressure gauge which includes a dual gauge, with one portion of the dial graduated for vacuum pressure and a second portion for positive pressure readings. The dial is adjustable to provide a desired zero reference.

U.S. Pat. No. 2,227,514 (Seegers) discloses another type of pressure gauge in which the dial is also calibrated for vacuum pressure and for positive pressure. The dial is adjustable to provide a desired zero reference.

U.S. Pat. No. 2,247,102 (Sugden et al) discloses a pressure gauge having an adjustable dial.

U.S. Pat. No. 3,969,931 (Lanning) discloses tester apparatus for testing the hydraulic capabilities of an outboard drive assembly.

Italian patent 277,473 (Drager) discloses the coupling of a gauge to a fluid line.

Italian patent 546,083 (Malakoff) discloses the use of a pressure gauge between threaded ends for insertion into a fluid line.

SUMMARY OF THE INVENTION

In view of the foregoing disadvantages inherent in the known methods of supplying water to a marine engine while being tested out of water, the instant invention provides an impeller tester which communicates to the operator that there is sufficient inlet water pressure available and correct outlet vacuum induced by the water impeller when the unit is tested out of water. This is necessary if an individual is to insure that the marine engine will be supplied with sufficient coolant when the water impeller is not being supplied with pressurized coolant from a household faucet. As such, the general purpose of the instant invention, which will be described subsequently in greater detail, is to provide a new and improved method of supplying pressurized coolant to a marine engine which has all the advantages of prior art and none of the disadvantages.

The marine engine, an inboard or an outboard engine, is equipped with an drive unit. This drive unit not only incorporates the means to propel the craft by the rotation of a propeller, but also incorporates a water impeller which provides the means to pump water to the marine engine's cooling components while the craft is in service.

Prior art devices are designed to supply water to the drive unit in order that the marine engine can be test run when the craft is out of the water prior to taking the craft to the desired recreation area, but do not incorporate any method of monitoring whether correct initial water pressure is present or whether the water impeller is functioning correctly.

One embodiment of the present invention comprises a cylinder housing which has a female thread at one end to allow a standard garden hose to be attached to the cylinder. On the other end of the cylinder is a male thread which allows the cylinder to be attached to existing devices used in supplying pressurized water to the drive unit. The invention also incorporates a nipple in its center to provide for the attachment of a calibrated gauge.

The gauge has two calibrated scales which are separated by a zero position between them. On one side of the zero position the gauge is calibrated to read water pressure in PSI, and on the other side of the zero position the gauge is calibrated to read Inches of Vacuum. The pressure side of the gauge measures the water pressure supplied to the drive unit from the garden hose or other source of input water. The gauge is scaled so the operator can adjust the inlet water pressure to a specific value and insure that a sufficient amount of water is being supplied so that the water impeller is not damaged when the marine engine is started. The gauge is rotatable to allow the scale to be rotated to the zero position prior to starting the engine. Upon starting the marine engine, the second scale of the gauge will communicate to the operator of the apparatus that the water impeller is providing adequate suction (Inches of Vacuum) to supply the engine with coolant water.

The gauge is calibrated in two modes to insure that the operator can visually determine by the calibrations on the gauge that sufficient water is initially being supplied and that the water impeller is providing sufficient suction to supply proper coolant to the engine when the craft is put in actual operation and the water impeller is not being supplied by a pressurized water source.

Additional forms of the present invention include the integration of the means to supply the pressurized water to the drive unit in conjunction with the impeller tester being an integral part of the water supplying device. Also, a form of the invention can be installed permanently in the watercraft and display to the operator that the water impeller is providing an adequate water supply to the engine while the craft is in actual use.

It is an object of the instant invention to provide a new and useful impeller tester which has all the advantages of the prior art and none of the disadvantages.

It is another object of the instant invention to provide a new impeller tester which may be easily and efficiently manufactured and marketed.

It is a further object of the instant invention to provide a new impeller tester which is of a durable and reliable construction.

It is another object of the present invention to provide new and useful apparatus for testing the impeller of a marine drive unit.

DESCRIPTION OF THE PREFERRED EMBODIMENT

Figure 1:
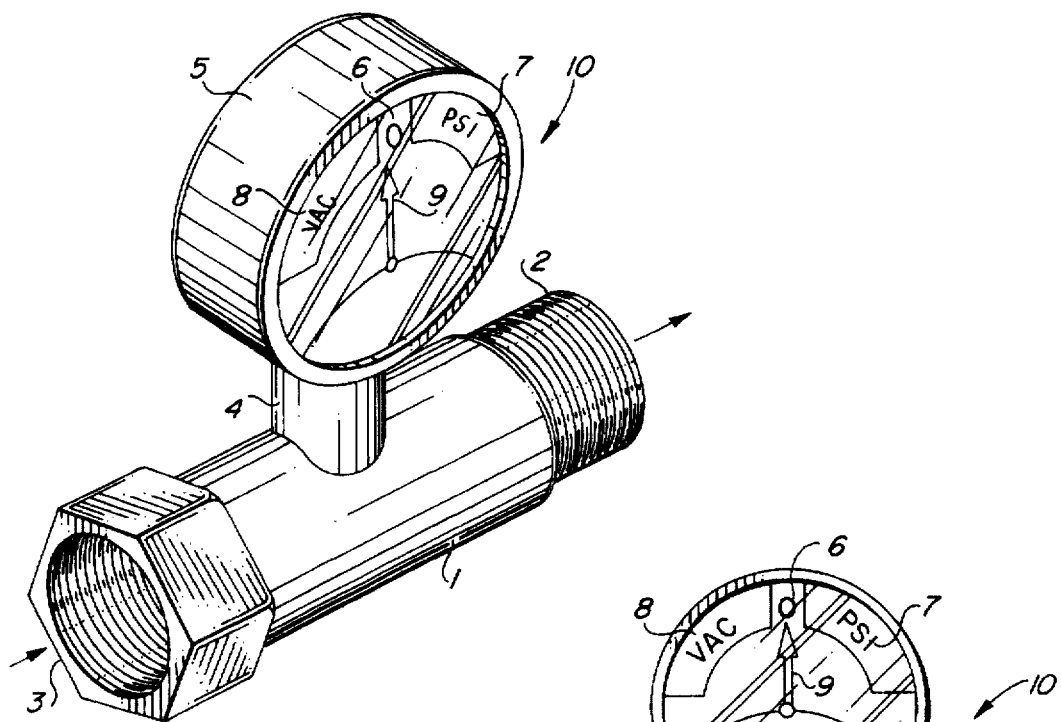
FIG. 1 is a perspective view of the apparatus of the present invention.

FIG. 1 is an isometric projection of an impeller tester apparatus 10 in accordance with the present invention. The apparatus 10 includes a cylinder 1 through which water flows in the direction indicated by the arrows. A calibrated gauge 5 is secured to the cylinder 1 to indicate the relative pressure of the water flowing through the cylinder 1.

Figure 2:
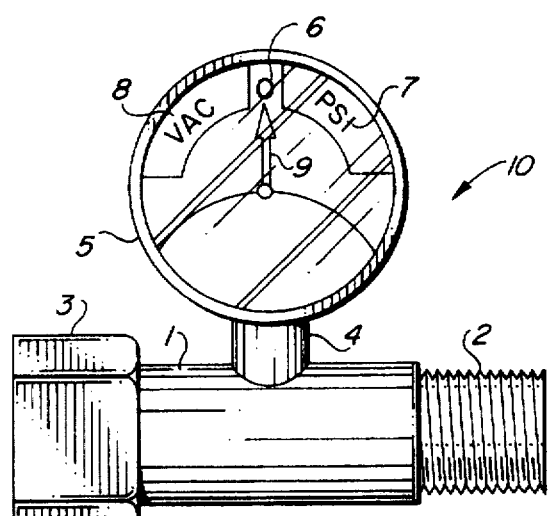
FIG. 2 is a front view of the apparatus of FIG. 1.

FIG. 2 is a front view of the calibrated gauge 5 included in the apparatus 10. The gauge 5 is set in a pre-test position and water is not being supplied to the crafts water impeller in the FIG. 2 condition.

Figure 3:
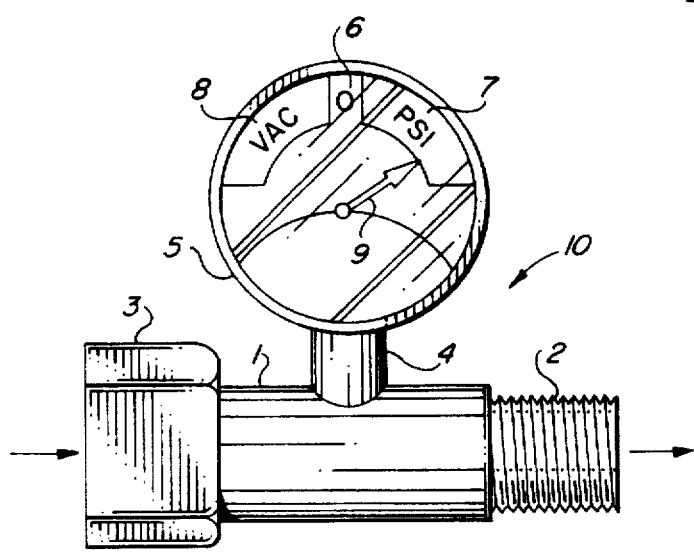
FIG. 3 is a front view of the apparatus of FIG. 2 illustrating the use thereof.

FIG. 3 is a front view of the calibrated gauge 5, with water being supplied to the water impeller tester apparatus 10. The gauge 5 is indicating the water pressure supplied to the water impeller of a craft prior to starting the craft's engine.

Figure 4:
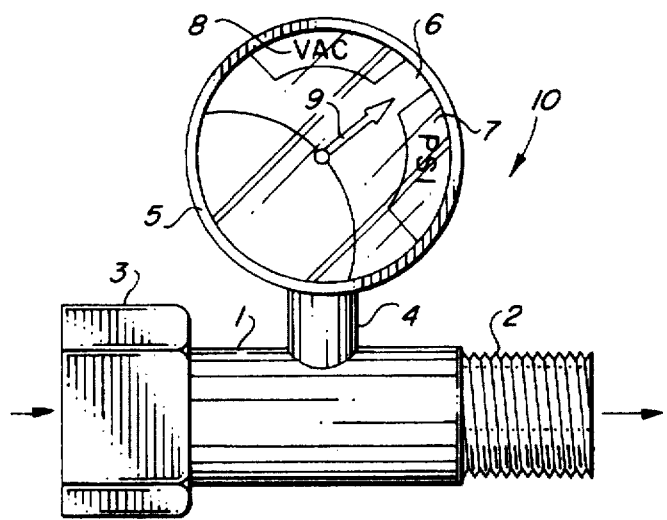
FIG. 4 is a front view of the apparatus of the present invention sequentially following FIG. 3 and illustrating the operation thereof.

FIG. 4 is a front pictorial view of the calibrated gauge 5 sequentially following FIG. 3, with the gauge 5 rotated clockwise to the zero position, effectively canceling out the pressure of the supplied water for test purposes.

Figure 5:
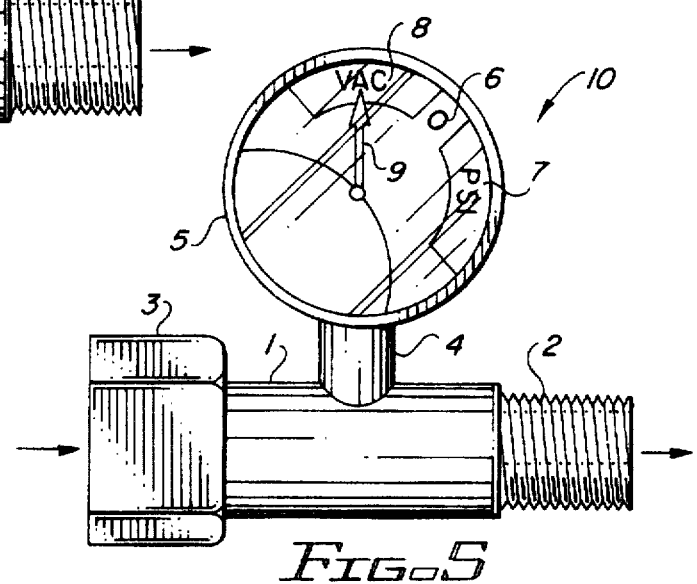
FIG. 5 is a front view of the apparatus of the present invention sequentially following FIG. 4 in illustrating the operation of the apparatus.

FIG. 5 is a front pictorial view of the calibrated gauge 5, sequentially following FIG. 4. The craft's engine is now started and the calibrated gauge 5 is indicating that sufficient vacuum is being produced by the water impeller of the craft to insure that sufficient coolant is supplied to the engine of the craft when the craft is put in actual operation.

Arrows in FIGS. 1, 3, 4, and 5 indicate the direction of water flow.

The impeller tester apparatus 10 comprises the cylinder member 1, and at one end of the cylinder 1 there is an attachment 3 which allows the impeller tester 10 to be connected to a standard household water faucet or hose bib by a garden hose (See FIG. 1). At the opposite end of the cylinder 1 is a male threaded end 2 which attaches to an existing water supply device, such as a garden hose (not shown), for supplying coolant to the drive of a boat.

Also attached to the cylinder member 1 is a nipple 4 which allows the calibrated gauge 5 to be attached to the cylinder member 1. The calibrated gauge 5 includes a zero position 6 between a positive pressure scale 7 and a vacuum pressure scale 8. Pressure is indicated by a pointer 9.

The calibrated gauge 5 incorporates the means for the operator to determine the necessary water pressure required for the water impeller by monitoring the reading of the pointer 9 on the positive pressure scale 7 when water is supplied but prior to starting the engine as shown in FIG. 3.

The calibrated gauge 5 is also capable of being rotated to the pre-test zero position 6. After the water impeller is supplied with an adequate water supply, as specified on the scale 7 within the calibrated gauge 5, the gauge is then rotated to the zero position 6, as shown in FIG. 4. At this time the marine engine is then started. The operator can then observe the vacuum scale 8 of the calibrated gauge 5 to determine if sufficient vacuum is being produced by the water impeller to supply the marine engine with proper coolant during its normal operation. This is determined by the operator observing the indication of the pointer 9 within vacuum scale 8, as shown in FIG. 5.

If the pointer 9 is within the appropriate range or scale value within the vacuum scale 8, then the required vacuum is present to insure that the water impeller is operating properly and will supply the marine engine with sufficient coolant to allow for safe operation when the craft in which the engine and the drive unit is disposed is put in its intended use environment.

Figure 6:
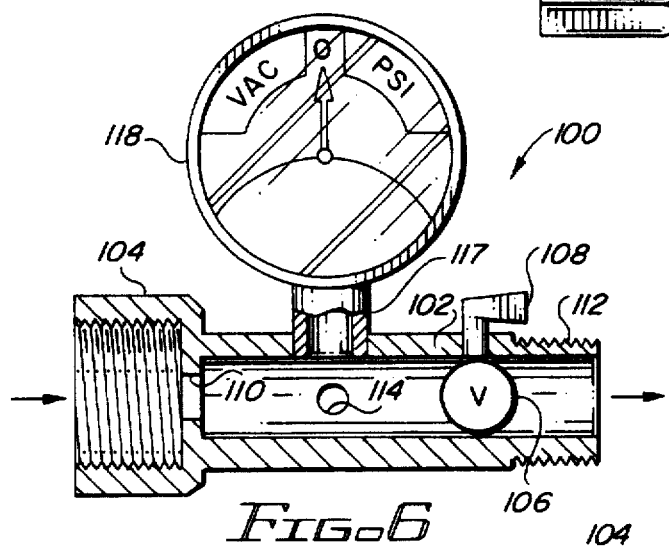
FIG. 6 is a view in partial section schematically illustrating an alternate embodiment of the apparatus of FIGS. 1–5.
Figure 7:
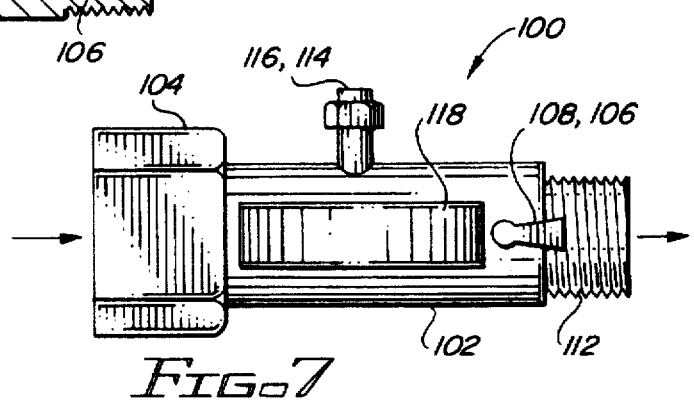
FIG. 7 is a top view of the apparatus of FIG. 6.

FIG. 6 comprises a view in partial section schematically illustrating an alternate embodiment 100 of the apparatus 10 of FIGS. 1–5. FIG. 7 is a top view of the apparatus 100 of FIG. 6. For the following discussion, reference will primarily be made to FIGS. 6 and 7.

The embodiment 100 comprises a cylinder 102 with an input connector 104 on one end and a threaded, output connector 112 at the opposite end of the cylinder 102 from the input connector 104. Large arrows adjacent to FIGS. 6 and 7 illustrate the direction of the flow of the water through the apparatus 100.

Remote from the input connector 104, which is substantially identical to the attachment connector 3 of the apparatus 10 of FIGS. 1-5, and adjacent to the output connector 112, is a valve 106. The valve 106 is disposed within the bore of the cylinder 102. The valve 106 is a variable flow valve. The valve 106 includes a valve actuator 108 extending outwardly from the cylinder 102. Movement of the actuator 108 varies the flow through the valve 106 and accordingly through the cylinder 102.

Adjacent to the input connector 104 is an orifice 110. The orifice 110 extends through a wall at the input end 104 of the cylinder 102.

The purpose of the orifice 110 is to make certain that the apparatus 100 functions properly with relatively low water pressure as input to the apparatus 100. The orifice also regulates flow rates for various size engine displacements. Thus, the orifice 110 will be sized appropriately according to engine displacement.

Extending radially through the cylinder 102 is an air bleed aperture 114. The air bleed aperture 114 extends to an air bleed valve 116. The valve is shown in FIG. 7, while the aperture is shown in FIG. 6.

The purpose of the aperture 114 and the valve 116 is to allow air to be bled from the apparatus 100 when water is initially turned on. That is, when a hose is connected to the input connector 104, and water is turned on, the air bleed valve 116 is opened, and remains open until water flows substantially continuously from the valve 116. By that time, air has been purged from the apparatus 100 and the valve 116 may then be closed.

Extending upwardly from the cylinder 102 between the valve 106 and orifice 110 is a nipple or conduit 117. The nipple or conduit 117 extends between the cylinder 102 and a gauge 118. The gauge 118 is substantially identical to the gauge 5 of the apparatus of FIGS. 1-5. The gauge 118 accordingly includes provision for zeroing the pointer after the initial water pressure stabilizes and before the engine to which the apparatus is connected begins to run. This is all as discussed above.

The purpose of the valve 106 and its actuator 108 is to enable an operator or user of the apparatus 100 to provide a desired initial pressure for the apparatus. In essence, the valve 106 and its actuator 108 works in conjunction with the orifice 110. It is preferable to have an initial desired pressure of 8 to 12 PSI from the input water connection 104 through the apparatus 100 and on to the tester apparatus, as will be discussed in detail below.

It appears that a minimum of pressure of about 6 PSI is required in order to accurately test an impeller of a boat drive system. Thus, when the air bleed valve 116 is closed, the valve actuator 108 is adjusted to control the flow through the cylinder 102 in order to provide the desired initial pressure of about 8 to 12 PSI. A maximum desired pressure is about 14 PSI. When the initial pressure has been set, the indicator or pointer is then zeroed, as illustrated in FIG. 4, in order to test the impeller of the boat drive, as will be discussed in detail below.

If desired, the absolute pressure scale of the gauge 118, which shows only the pressure of the water, before the zeroing function, may be appropriately color coded. Accordingly, there would be a yellow line between 6 and 8 PSI on the scale, then a green line between 8 and 12 PSI, and another yellow line between 12 and 14 PSI. A red line would extend above 14 PSI to indicate that such pressure is too high for proper functioning of the tester apparatus.

There has thus been outlined, rather broadly, the more important features of the instant invention in order that the detailed description may be better understood, and in order that the present contribution to the art may be better appreciated. Those skilled in the art will appreciated that the conception, upon which this disclosure is based, may readily be utilized as a basis for the designing of other structures, methods and systems for carrying out the several purposes of the instant invention. It is important, therefore, that the claims be regarded as including such equivalent constructions insofar as they do not depart from the spirit and scope of the instant invention.

The gauges discussed above in conjunction with the various embodiments have been generally described simply as "gauges" without regard to their types. Reference has been made to absolute pressure, and, of course, reference has been made to the zeroing of the gauge and the illustration of vacuum pressure on one side of the zero and positive pressure on the other side of the scale. This is best shown in FIGS. 1-5. The pressure gauges accordingly are preferably direct reading pressure gauges, in which the pressure is a direct reading resulting from the flow of the water through the cylinders to which the gauges are attached. However, it may be desired to use a liquid filled gauge, which includes a diaphragm for actuating a pressure pointer. In such case, a movable bezel will be fitted over the liquid filled gauge, with the movable bezel simply showing a zero index which will be placed over the pointer after the initial pressure has been established. When the engine of the boat is started after the gauge has been zeroed, a pressure drop may be noted from the zero point.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Apparatus for testing an impeller of a marine engine drive unit comprising in combination:

a marine engine having a drive unit;

a cylinder;

an input connector for providing a flow of water to the cylinder before the marine engine is started;

an output connector on the cylinder for connecting the flow of water to the impeller of the marine engine drive unit;

an air bleed valve for bleeding air out of the cylinder in response to the flow of water;

a gauge connected to the cylinder for indicating the pressure of the flow of water;

a pointer on the gauge responsive to the pressure of the flow of water;

a rotatable dial having a vacuum pressure indication, a positive pressure indication, and a zero indication between the vacuum pressure and positive pressure indications for zeroing the pointer of the gauge after the flow of water has been provided for testing the impeller by responding to the flow of water after the marine engine is started whereby the movement of the pointer away from the zero indication after the marine engine is started provides an indication of the condition of the impeller.

2. The apparatus of claim 1 which further includes an orifice in the cylinder through which the water flows to control the flow of water.

3. The apparatus of claim 2 which further includes a variable flow valve for varying the pressure of the flow of water to provide a desired pressure for testing the impeller.

4. The apparatus of claim 1 which further includes a variable flow valve for varying the pressure of the flow of water through the cylinder.

5. The apparatus of claim 4 which further includes an orifice in the cylinder upstream from the variable flow valve.

6. Apparatus for testing an impeller of a marine engine drive unit comprising in combination:

a marine engine having a drive unit;

a cylinder;

an input connector for providing a flow of water to the cylinder before the marine engine is started;

an output connector for connecting the flow of water to the impeller of the marine engine drive unit;

a gauge connected to the cylinder for indicating the pressure of the flow of water;

a pointer on the gauge responsive to the pressure of the flow of water;

a rotatable dial having a vacuum pressure indication, a positive pressure indication, and a zero indication between the vacuum pressure and positive pressure indications for zeroing the pointer of the gauge after the flow of water has been provided for testing the impeller by responding to the flow of water after the marine engine is started whereby the movement of the pointer after the marine engine is started provides an indication of the condition of the impeller; and an orifice in the cylinder through which the water flows to allow for the measuring of relatively low water pressure.

7. The apparatus of claim 6 which further includes an air bleed valve for bleeding air out of the cylinder in response to the flow of water.

8. The apparatus of claim 6 which further includes a variable flow valve in the cylinder for varying the pressure of the flow of water.

9. Apparatus for testing an impeller of a marine engine drive unit comprising in combination:

a marine engine having a drive unit;

a cylinder;

an input connector for providing a flow of water to the cylinder before the marine engine is started;

an output connector for connecting the flow of water to the impeller of the marine engine drive unit;

a variable flow valve in the cylinder for varying the flow of water in the cylinder;

a gauge connected to the cylinder for indicating the pressure of the flow of water;

a pointer on the gauge responsive to the pressure of the flow of water;

a rotatable dial having a vacuum pressure indication, a positive pressure indication, and a zero pressure indication between the vacuum pressure and positive pressure indications for zeroing the pointer of the gauge after the flow of water has been provided for testing the impeller by responding to the flow of water after the marine engine is started whereby movement of the pointer after the marine engine is started provides a test indication of the impeller.

10. The apparatus of claim 9 which further includes an orifice in the cylinder through which the water flows.

11. The apparatus of claim 9 which further includes an air bleed valve for bleeding air out of the cylinder in response to the flow of water.

* * * * *